United States Patent
Hein

(10) Patent No.: US 10,397,222 B2
(45) Date of Patent: *Aug. 27, 2019

(54) AUTHENTICATING A LIMITED INPUT DEVICE VIA AN AUTHENTICATED APPLICATION

(71) Applicant: GoPro, Inc., San Mateo, CA (US)

(72) Inventor: Christopher Hein, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/906,184

(22) Filed: Feb. 27, 2018

(65) Prior Publication Data

US 2018/0255057 A1 Sep. 6, 2018

Related U.S. Application Data

(63) Continuation of application No. 14/873,162, filed on Oct. 1, 2015, now Pat. No. 9,942,229.

(Continued)

(51) Int. Cl.
*H04L 29/06* (2006.01)
*H04N 5/225* (2006.01)
(Continued)

(52) U.S. Cl.
CPC ...... *H04L 63/0876* (2013.01); *H04L 63/0838* (2013.01); *H04L 63/0853* (2013.01);
(Continued)

(58) Field of Classification Search
None
See application file for complete search history.

(56) References Cited

U.S. PATENT DOCUMENTS 6,772,331 B1   8/2004 Hind
9,148,548 B2 * 9/2015 Nuggehalli ........... H04L 63/083
(Continued)

OTHER PUBLICATIONS

No stated author; "6D Can't upload pictures to Facebook"; 2013; Retrieved from the Internet <URL: https://community.usa.canon.com/t5/EOS/6D-Can-t-upload-pictures-to-Facebook/td-p/18629>; pp. 1-2, as printed. (Year: 2013).*

(Continued)

*Primary Examiner* — Saleh Najjar
*Assistant Examiner* — Michael W Chao
(74) *Attorney, Agent, or Firm* — Young Basile Hanlon & MacFarlane, P.C.

(57) ABSTRACT

A limited input device, such as a camera, is authenticated based on a request received from an authenticated application. The application can request an application server to provide the application with a one-time authorization code. The request includes the device identifier associated with the camera. The server stores an association between the one-time authorization code and the device identifier of the camera, and provides the application with the one-time authorization code. The application provides the camera with the one-time authorization code. The camera transmits a request for an access token to the server, the request for the access token including the one-time authorization code and the device identifier associated with the camera. The server verifies the device identifier associated with the camera with that associated with the one-time authorization code, and upon a positive verification authenticates the camera by providing the camera with the access token.

11 Claims, 5 Drawing Sheets

Related U.S. Application Data

(60) Provisional application No. 62/059,764, filed on Oct. 3, 2014.

(51) Int. Cl.
  *H04L 29/08* (2006.01)
  *H04N 5/232* (2006.01)

(52) U.S. Cl.
  CPC ........ *H04L 63/0884* (2013.01); *H04L 63/102* (2013.01); *H04L 67/02* (2013.01); *H04L 67/125* (2013.01); *H04L 67/42* (2013.01); *H04N 5/2254* (2013.01); *H04N 5/23203* (2013.01)

(56) References Cited

U.S. PATENT DOCUMENTS

| | | | |
|---|---|---|---|
| 9,532,094 B2* | 12/2016 | Karp | H04W 4/80 |
| 9,838,390 B2* | 12/2017 | Zakaria | H04W 4/70 |
| 9,838,651 B2* | 12/2017 | Bateman | H04N 7/181 |
| 9,887,991 B2* | 2/2018 | Allinson | G06F 21/34 |
| 9,888,380 B2* | 2/2018 | Gupta | H04W 12/06 |
| 9,955,332 B2* | 4/2018 | Raleigh | H04W 4/50 |
| 10,044,939 B2* | 8/2018 | Flores | H04N 5/23203 |
| 10,244,375 B2* | 3/2019 | Zerr | H04W 4/80 |
| 2002/0158970 A1 | 10/2002 | Takeshi | |
| 2005/0134688 A1 | 6/2005 | Belz | |
| 2006/0087560 A1 | 4/2006 | Moran | |
| 2007/0003061 A1 | 1/2007 | Jung | |
| 2007/0005963 A1 | 1/2007 | Eldar | |
| 2007/0219685 A1 | 9/2007 | Plante | |
| 2008/0261560 A1 | 10/2008 | Ruckart | |
| 2009/0113527 A1 | 4/2009 | Naaman | |
| 2009/0122149 A1 | 5/2009 | Ishii | |
| 2010/0083363 A1 | 4/2010 | Blinn | |
| 2010/0293198 A1 | 11/2010 | Marinucci | |
| 2013/0103847 A1 | 4/2013 | Brown | |
| 2013/0235222 A1* | 9/2013 | Karn | H04N 5/23203 348/211.2 |
| 2014/0053182 A1* | 2/2014 | Jaager | H04N 21/41415 725/25 |
| 2014/0059660 A1* | 2/2014 | Marra | G06F 21/335 726/5 |
| 2014/0082707 A1 | 3/2014 | Egan | |
| 2014/0115664 A1* | 4/2014 | Boliek | H04L 67/26 726/3 |
| 2014/0133831 A1 | 5/2014 | Billau | |
| 2014/0164544 A1* | 6/2014 | Gagneraud | H04L 67/104 709/208 |
| 2014/0189840 A1* | 7/2014 | Metke | G06F 21/41 726/9 |
| 2014/0189841 A1* | 7/2014 | Metke | H04L 63/0815 726/9 |
| 2014/0223516 A1* | 8/2014 | Vongsouvanh | H04L 63/0492 726/4 |
| 2014/0230020 A1 | 8/2014 | Mogaki | |
| 2014/0282991 A1 | 9/2014 | Watanabe | |
| 2015/0113615 A1 | 4/2015 | Foster | |
| 2015/0271739 A1 | 9/2015 | Numakami | |
| 2015/0365480 A1 | 12/2015 | Soto | |
| 2016/0011830 A1* | 1/2016 | Asakura | H04W 76/10 358/1.15 |
| 2016/0065831 A1* | 3/2016 | Howard | H04N 5/23206 348/211.2 |
| 2016/0134932 A1* | 5/2016 | Karp | H04W 4/80 348/155 |
| 2016/0323457 A1 | 11/2016 | Isomaki | |
| 2017/0048700 A1 | 2/2017 | Huang | |
| 2017/0118037 A1* | 4/2017 | Kitchen | H04L 12/2818 |
| 2019/0096236 A1* | 3/2019 | Arling | G08C 23/04 |
| 2019/0098090 A1* | 3/2019 | Binder | H04L 67/12 |

OTHER PUBLICATIONS

No stated author; EOS Remote; 2013; Retrieved from the Internet <URL: https://web.archive.org/web/20131106071350/https://www.canon-europe.com/for_home/product_finder/cameras/digital_slr/eos_remote.aspx>; pp. 1-6, as printed. (Year: 2013).*

No stated author; Establishing Wi-Fi on a 6D; 2013; Retrieved from the Internet <URL: https://photography-on-the.net/forum/showthread.php?t=1262191>; pp. 1-6, as printed. (Year: 2013).*

PCT International Search Report and Written Opinion for PCT/US2015/053825, dated Dec. 22, 2015, 11 Pages.

Ed Hardt; RFC 6749—The OAuth 2.0 Authorization Framework; 2012; Retrieved from the Internet <URL: https://tools.ietf.org/pdf/rfc6749.pdf>; pp. 1-76, as printed.

EP Supplementary European Search Report for 15845862.0 dated Sep. 20, 2017 (8 pages).

* cited by examiner

AUTHENTICATING A LIMITED INPUT DEVICE VIA AN AUTHENTICATED APPLICATION

CROSS REFERENCE TO RELATED APPLICATIONS

This application is a continuation of U.S. application Ser. No. 14/873,162, filed Oct. 1, 2015, now U.S. Pat. No. 9,942,229, which application claims the benefit of U.S. Provisional Application No. 62/059,764, filed on Oct. 3, 2014, all of which are incorporated by reference in their entirety.

BACKGROUND

Technical Field

This disclosure relates to a camera system, and more specifically, to authenticating a limited input device.

Description of the Related Art

Limited input appliances and devices (e.g., digital cameras) are increasingly used in everyday life. For example, digital cameras are used to capture videos in a variety of settings, for instance outdoors or in a sports environment. However, as users capture increasingly more and longer content (e.g., videos), management of that content becomes increasingly difficult. By way of example, users may like to upload videos to a server or manage content (e.g., videos or images) on a camera, remotely using the server. In order to link a camera to a user account associated with a user in a secure fashion, an authentication protocol is often used. Authentication protocols often require a user of a device (e.g., camera) to input credential information allowing a server to authenticate the device and associate the device with the user. However, devices, such as cameras, often have limited input options (e.g., a limited selection of input controls, such as buttons), thereby making it difficult for users of such cameras to authenticate and link cameras to a user account associated with a user, as users are often unable to enter credential information required during the authentication process.

BRIEF DESCRIPTIONS OF THE DRAWINGS

The disclosed embodiments have advantages and features which will be more readily apparent from the following detailed description of the invention and the appended claims, when taken in conjunction with the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Camera System Configuration

Figure 1:
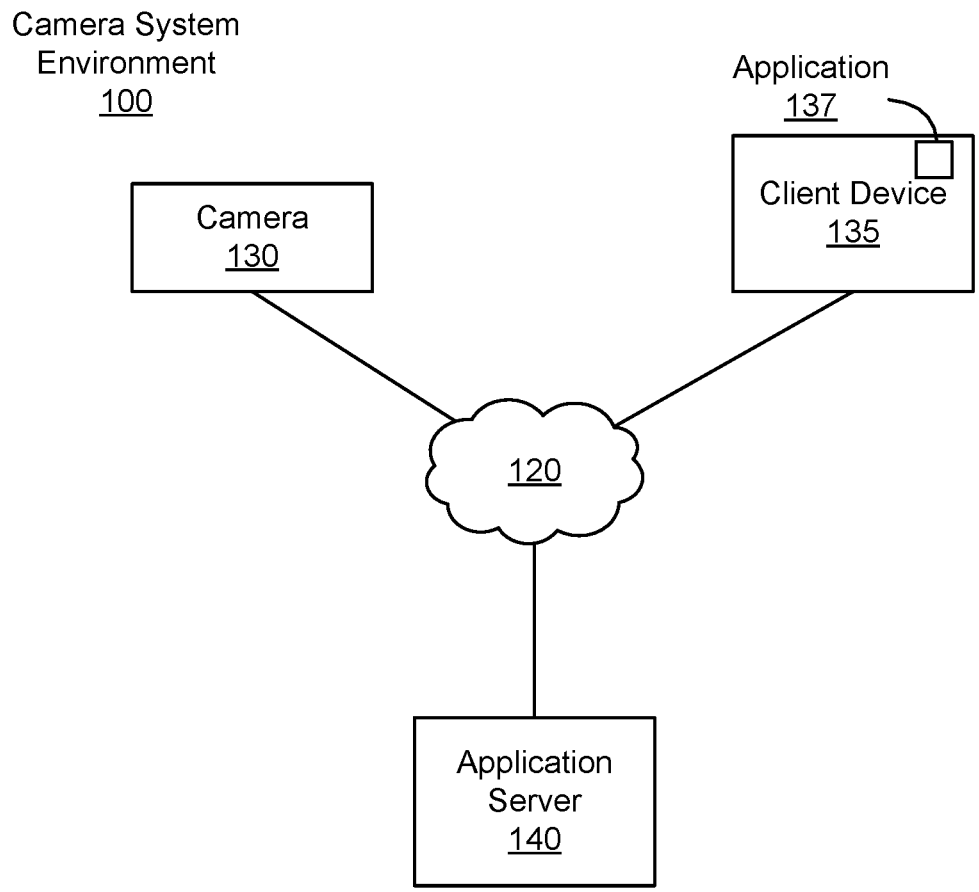
FIG. 1 is a block diagram of a camera system environment, according to one embodiment.

FIG. 1 is a block diagram of a camera system environment 100, according to one embodiment. The camera system environment 100 includes a camera 130, a client device 135 and an application server 140. Each of these entities includes or comprises a computing device that can be physically remote from each other but which are communicatively coupled by the computer network 120. The network 120 is typically the Internet, but can be any network(s), including but not limited to a LAN, a MAN, a WAN, a mobile wired or wireless network, a private network, a virtual private network, or a combination thereof. In one embodiment, the network 120 uses standard wired or wireless communications technologies and/or protocols. In some embodiments, all or some of the communication links of the network 120 can be encrypted using any suitable technique(s). In alternative configurations, different and/or additional components can be included in the camera system environment 100.

The camera 130 is configured to capture still images and/or videos. Structurally, a camera 130 can include a camera body having a camera lens structured on a front surface of the camera body, various indicators on the surface of the camera body (e.g., light emitting displays), and electronics (e.g., imaging electronics, power electronics, metadata sensors, etc.) internal to the camera body for capturing images via the camera lens and/or performing other functions.

The camera 130 is an example of a limited input device. A limited input device is a device capable of receiving a limited number of user inputs or a device with a fairly minimal interface making it inconvenient for a user of the camera 130 to perform essential functions associated with the device, such as providing credential information to authenticate and register the device. Various embodiments described below with respect to the camera 130 can also apply to other limited input devices such as a smartwatch, an activity tracker or a personal health monitor.

In one embodiment, the camera 130 communicates with the application server 140 via the network 120 to authenticate the camera 130 and confirm an association of the camera 130 with a user of the client device 135. In one example, the camera 130 and the application server 140 use a protocol (e.g., OAuth protocol) to authenticate the camera 130. The camera 130 also communicates with an application 137 executing on the client device 135 to assist the user of the client device 135 and the camera 130 with the authentication of the camera 130.

The client device 135 is any computing device capable of receiving user inputs as well as transmitting and/or receiving data via the network 120. In some embodiments, the client device 135 is a conventional computer system, such as a desktop or a laptop computer. In other embodiments, the client device 135 is be a device having computer functionality, such as a personal digital assistant (PDA), a mobile telephone, a smartphone or another suitable device. In contrast to the camera 130, the client device 135 is not a limited input device. One or more input devices associated with the client device 135 receives input from the user of the client device 135. For example, the client device 135 can receive input from a touch-sensitive display, a keyboard, a trackpad, a mouse, a voice recognition system, and the like. In some embodiments, the client device 135 can access image/video data from the camera 130, and can transfer the accessed image/video data to the application server 140 via the network 120.

In one embodiment, the client device 135 includes an application 137. The user of the client device 135 can use the application 137 to view and interact with content, such as images/videos, captured by the camera 130 or stored on the application server 140. The user can communicate with the camera 130 using the application 137 executing on the client device 135, for example, by transmitting instructions to the camera 130. The user can interact with the application 137 to authenticate the application 137 executing on the client device 135 and to authenticate the camera 130. While FIG. 1 shows a single client device 135, in various embodiments, any number of client devices 135 can communicate with the application server 140 and the camera 130.

The application server 140 communicates via the network 120 with the client device 135 and the camera 130, to authenticate the camera 130 or the client device 135.

Camera Configuration

Figure 2:
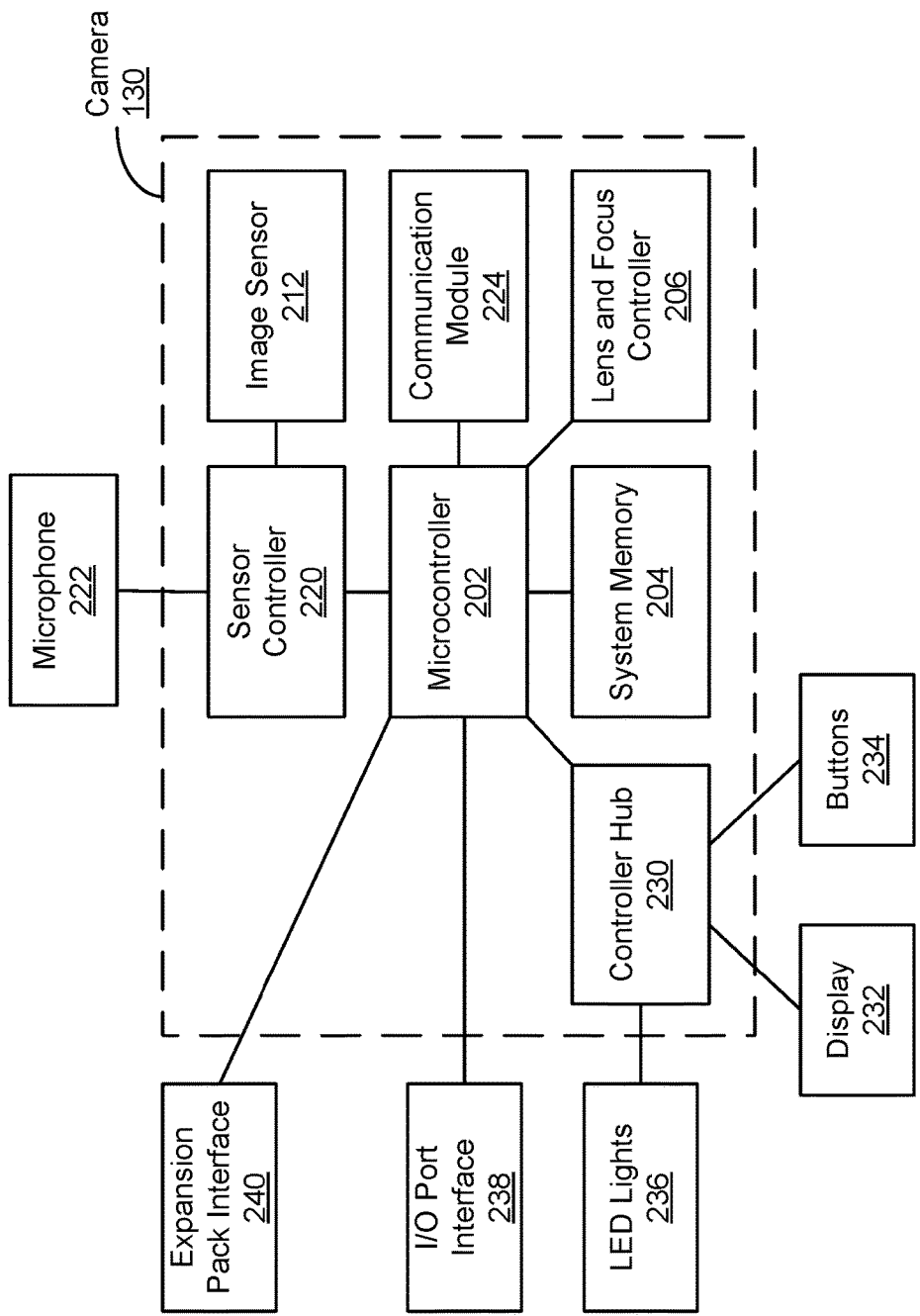
FIG. 2 is a block diagram illustrating a camera system, according to one embodiment.

FIG. 2 is a block diagram illustrating a camera system, according to one embodiment. The camera 130 includes one or more microcontrollers 202 (e.g., microprocessors) that control the operation and functionality of the camera 130. A lens and focus controller 206 is configured to control the operation and configuration of a lens of the camera. A system memory 204 is configured to store executable computer instructions that, when executed by the microcontroller 202, perform the camera functionalities described herein.

A communication module 224 is configured to allow the camera 130 to communicate with external devices, such as a remote control, a second camera 130, a smartphone, the client device 135, or the application server 140. In one example, the communication module 224 communicates with the application 137 executing on the client device 135 to exchange credential information and pair with the application 137. In another example, the communication module 224 is configured to synchronize the camera 130 with the application 137 executing on the client device 135 such that the camera 130 can receive instructions from the application 137 related to various functions performed by the camera 130, such as capturing a video. In a third example, the communication module 224 communicates with the application server 140 to transmit to the application server 140 images/videos captured by the camera 130.

The communication module 224 can facilitate the receiving or transmitting image and video information, and additional information through one or more I/O ports or interfaces on the camera 130. Examples of I/O ports or interfaces include Universal Serial Bus (USB) ports, High-Definition Multimedia Interface (HDMI) ports, Ethernet ports, audio ports, etc. Furthermore, the communication module 224 can include wireless interface controllers that can accommodate wireless connections. Examples of wireless interface controllers include Bluetooth, Wireless Universal Serial Bus (USB), Near Field Communication (NFC), etc.

In one embodiment, the communication module 224 communicates with the application server 140 and the application 137 executing on the client device 135 to authenticate the camera 130 so as to confirm the association between the camera 130 and the user of the client device 135. Given the camera 130 is a limited input device, the communication module 224 communicates with the application 137 to authenticate the camera 130 without receiving extensive user input from a user of the camera 130, such as credential information (e.g., a username and password). In one example, the communication module 224 receives a one-time authorization code from the application 137 (the application 137 having already been authenticated and associated with the user of the client device 135).

The communication module 224 provides the one-time authorization code to the application server 140 to authenticate the camera 130 as is further described in conjunction with FIG. 4A and FIG. 4B below. Once the one-time authorization code is verified by the application server 140, the application server 140 returns an access token to the communication module 224. In one embodiment, the access token allows the communication module 224 to make authenticated requests to the application server 140, such as an authenticated request for linking the camera 130 with a user account associated with a user of the client device 135, as is further described in conjunction with FIG. 4A and FIG. 4B below.

An expansion pack interface 240 is configured to interface with camera add-ons and removable expansion packs, such as a display module, an extra battery module, a wireless module, etc. A controller hub 230 transmits and receives information from various input/output (I/O) components. In one embodiment, the controller hub 230 interfaces with LED lights 236, a display 232, buttons 234, microphones such as microphone 222, speakers, etc. A sensor controller 220 receives image or video input from an image sensor 212. The sensor controller 220 receives audio inputs from one or more microphones 222.

Application Server Architecture

Figure 3:
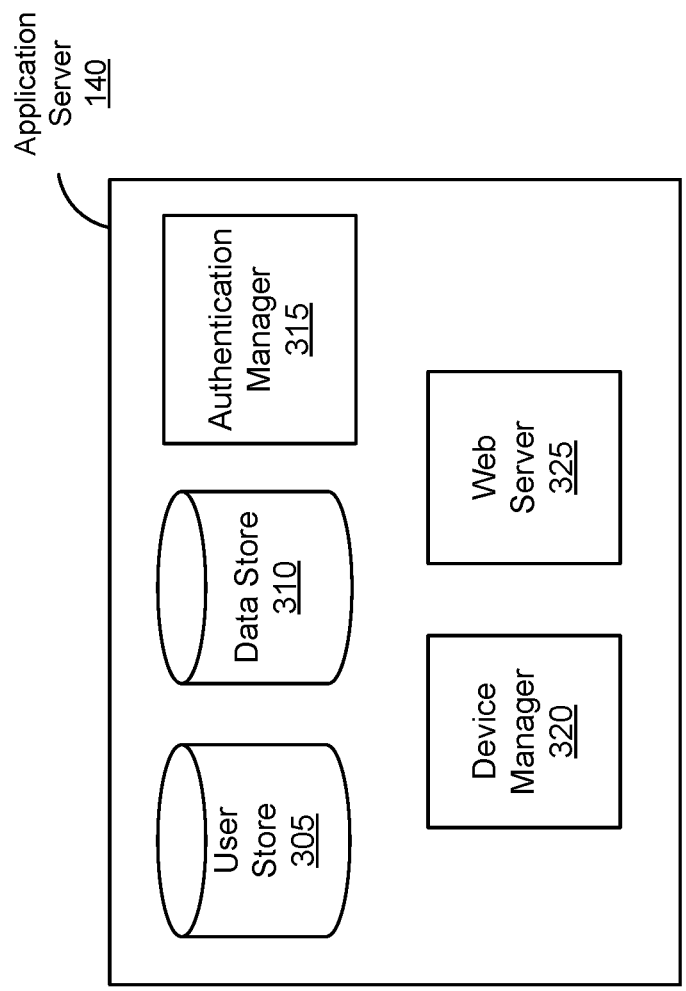
FIG. 3 is a block diagram of an application server, according to one embodiment.

FIG. 3 is a block diagram of an architecture of the application server 140. The application server 140 in the embodiment of FIG. 3 includes a user account storage module 305 ("user account store" hereinafter), a data storage module 310 ("data store" hereinafter), an authentication manager module 315 ("authentication manager" hereinafter), a device manager module 320 ("device manager" hereinafter), and a web server 325. It is noted that the modules maybe hardware (e.g., field programmable gate array (FPGA) enabled) and/or software (e.g., computer program instructions executable by the microcontroller 202). In some embodiments, the application server 140 may include additional, fewer, or different components for performing the functionalities described herein. Conventional components such as network interfaces, security functions, load balancers, failover servers, management and network operations consoles, and the like are not shown so as to not obscure the details of the system architecture.

Each user of the client device 135 creates a user account, and the user account is stored in the user account store 305. A user account includes information provided by the user (e.g., biographic information, geographic information, and the like) and may also include additional information inferred by the application server 140 (e.g., information associated with a user's previous use of a camera 130). Examples of user information include a username, a first and last name, contact information, a user's hometown or geographic region, other location information associated with the user, etc. It is noted that a user account is not limited to an individual, and could correspond to a group of individual, a company, or some other entity. Each user account is also associated with credential information such as a username and password that allow the user to access, add, or modify data associated with the user account. The credential information may be used by the user to authenticate the application 137 and confirm an association between the user account associated with the user and at least one of the client device 135 and the camera 130.

The data store 310 stores images/videos captured and uploaded by users associated with user accounts stored in the user account store 305. The data store 310 can store additional information associated with user accounts such as access tokens, refresh tokens, or authorization codes. Device information (e.g., device identifiers) identifying devices (e.g., a client device 135 or a camera 130) associated with user accounts also can be stored. In particular, the data store 310 can store associations between different pieces of information such as user accounts, device identifiers, access tokens, authorization codes, refresh tokens, etc. Accordingly, the application server 140 can verify one piece of information received from an external application or device by retrieving another piece of information determined from the stored association between the pieces of information.

The authentication manager 315 verifies credential information, access tokens, authorization codes, and/or refresh tokens received from the application 137 or the camera 130. The authentication manager 315 authenticates the application 137 executing on the client device 135 or the camera 130 by confirming that the application 137 or the camera 130 is associated with a user account stored in the user account store 305. In one embodiment, the authentication protocol used by the authentication manager 315 is the OAuth protocol. In one example, the authentication manager 315 authenticates a limited input device, such as the camera 130, by providing an authenticated application 137 paired with the limited input device with a one-time authorization code, as is described in greater detail with respect to FIG. 4A and FIG. 4B below.

The device manager 320 manages the devices associated with the user accounts stored in the user account store 305. For example, the device manager 320 registers or links an authenticated device (e.g., a client device 135 or a camera 130) with a user account by storing an association in the data store 310 associating the authenticated device with the user account. In one embodiment, the device manager 320 links an authenticated device to a user account based on an access token received from the authenticated device. For example, on receiving an access token from an authenticated device, the device manager 320 identifies a user account stored in the user account store 305 associated with the access token. An identifier linking the user account to the device information, such as the device identifier or the make and/or model of the authenticated device, is stored in the data store 310. Alternatively, the device manager 320 may add the device information to the user account linked to the authenticated device.

The web server 325 provides a communicative interface between the application server 140 and other entities of the environment illustrated in FIG. 1. For example, the web server 325 receives an authenticated request from the application 137 for a one-time code to assist in the authentication of the camera 130. The web server 325 can also receive user input provided to the client device 135, such as credential information provided to an application 137 executing on the client device 135, and can provide content such as images/videos associated with the user to the client device 135 or another external entity.

Authenticating a Limited Input Device

Figure 4A:
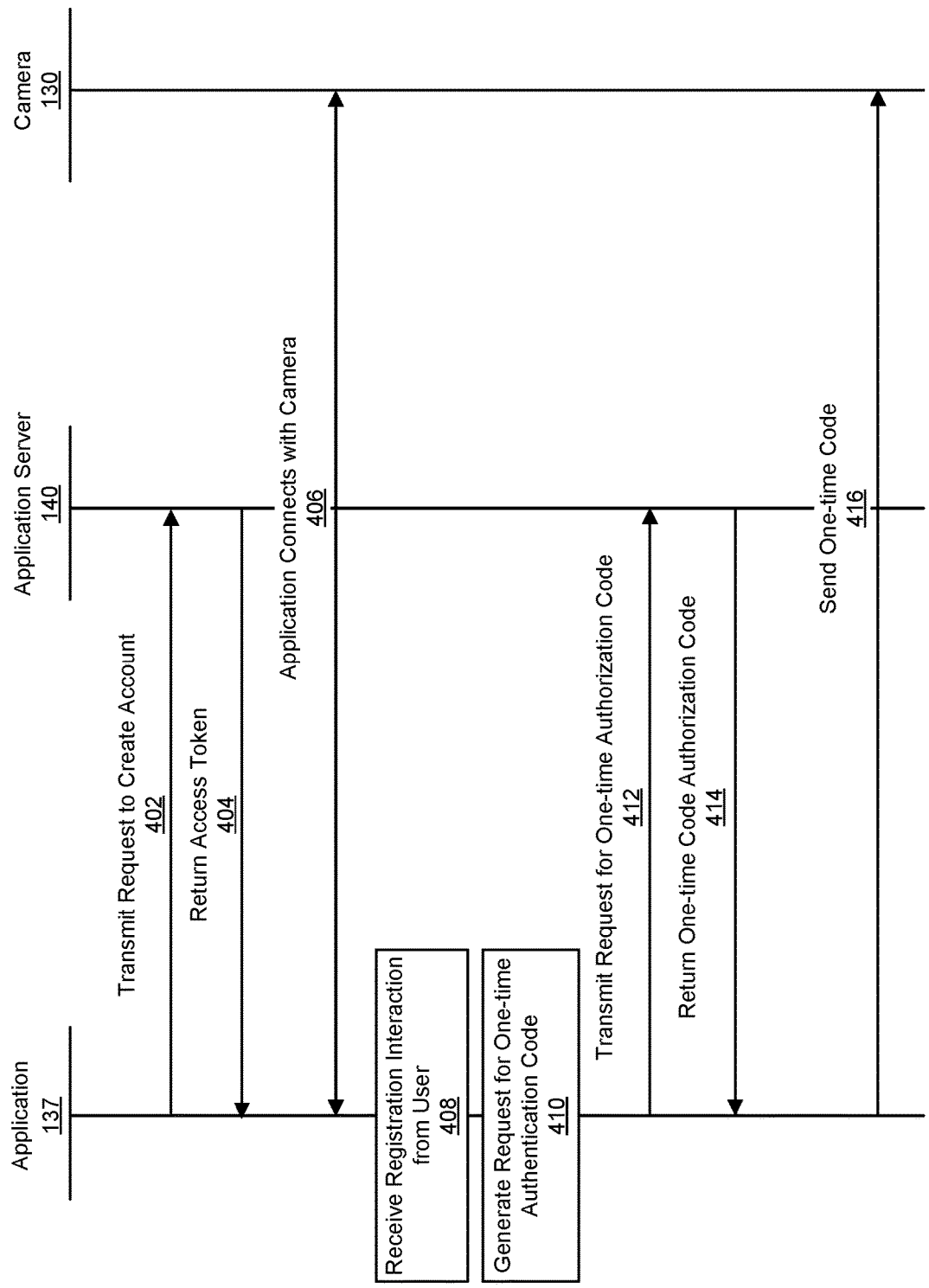
FIGS. 4A and 4B are interaction diagrams illustrating a method for authenticating and registering a camera, according to one embodiment.
Figure 4B:
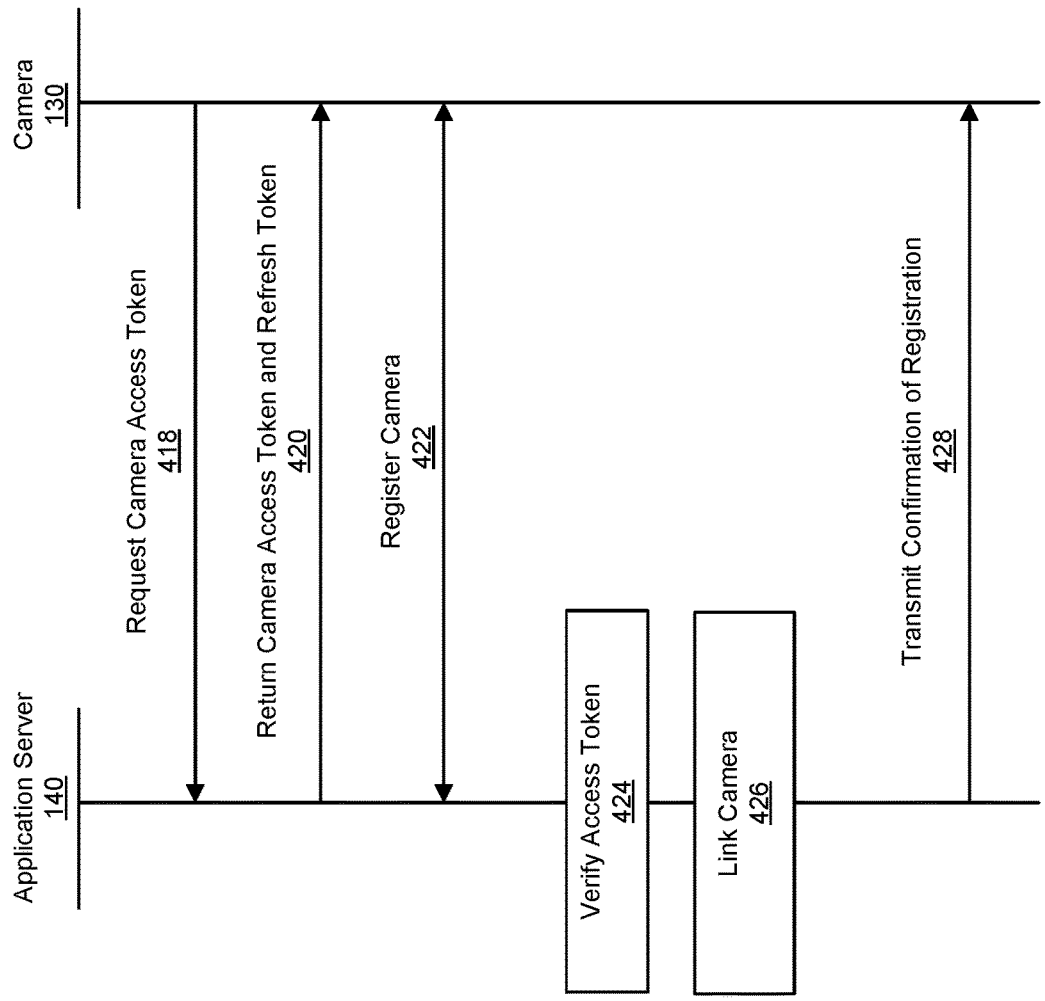

FIGS. 4A and 4B are interaction diagrams illustrating a method for authenticating and registering a camera, according to one example embodiment. FIG. 4A and FIG. 4B describe an example authentication of the application 137 executing on the client device 135, and the authentication of the camera 130 (a limited input device) based on an authenticated request received from the application 137. The user of the client device 135 is a first time user of the application 137. The application 137 receives a variety of user account information from the user via an interface presented to the user and transmits 402 a request to create a user account to the application server 140. The request can include the user account information to associate with the user, credential information, such as a username and a password, and a device identifier identifying the application 137 or the client device 135.

On receiving 402 the request to create a user account from the application 137, the application server 140 authenticates the application 137 and creates a user account associated with the user based on the received credential information and the user account information. In one example, the application server 140 stores the user account information, the credential information, and the device identifier in the user account store 305 and/or the data store 310. The application server 140 generates a client secret value for the device identifier associated with the user account and stores the client secret value in the data store 310. The client secret value is a private key associated with the device identifier that allows the application server 140 to authenticate an application 137 based on the device identifier received from the application 137 matching the device identifier associated with the client secret value.

The application server 140 can take additional steps to authenticate the application 137 and verify that the user using the application 137 executing the client device 135 is indeed the user requesting the creation of a user account on the application server 140. For example, the application server 140 can transmit to the user a verification email asking the user to confirm that he or she requested the creation of a user account via the application 137. After authenticating the application 137, the application server 140 generates an access token, associates the access token with the user account associated with the user, stores the access token in the data store 310, and returns 404 a copy of the access token to the application 137. The access token is a unique value representing the credential information associated with a user and identifying a user account associated with the user. The application 137 communicates authenticated requests to the application server 140 by including the access token in the communication to the application server 140.

In addition to the access token, the application server 140 also can return 404 a token type value, an expiration value, a refresh token and a scope value to the application 137. The access token can be associated with an expiration value. The expiration value is a threshold period of time for which the access token is valid. For example, the access token can be valid from the time the access token was generated or returned 404 to the application 137 to a pre-determined period of time after the access token is generated or returned (e.g., 5 minutes).

In the event that the access token expires, the application 137 can use the refresh token provided by the application server 140 to receive a different access token. On determining that the access token has expired, the application 137 can transmit to the application server 140 a communication including the refresh token, the device identifier and the client secret value associated with the application 137 to request a new access token. On verifying that the refresh token is associated with the device identifier and client secret value included in the communication, the application server 140 can generate a new access token, associate the new access token with the user's user account, store the new access token in the data store 310, and return the new access token along with a new refresh token and expiration value to the application 137. The scope value returned 404 to the application 137 can include space delimited strings of characters defining the scope to which the application 137 has access.

The application 137 connects or pairs 406 with the camera 130. The application 137 can connect to the camera 135 over a variety of I/O ports or interfaces as described above with reference to FIG. 2. On pairing with the camera 130, the application 137 can retrieve device information associated with the camera 130 such as a device identifier identifying the camera 130.

Once the application 137 is connected to the camera 130, the application 137 can prompt the user of the client device 135 to register the camera 130 with the application server 140 to enable the application server 140 and the camera 130 to communicate with one another. For example, the application 137 presents the user of the client device 135 with an interface including a button requesting a user interaction to register the camera 130. On prompting the user to register the camera 130, the application 137 receives 408 a registration interaction from the user to register the camera 130 connected to the application 137. After receiving 408 the user interaction, the application 137 generates 410 a request for a one-time authorization code. In one embodiment, the request for the one-time authorization code includes the access token, the device identifier and the client secret value associated with the application 137, and the scope value. The application 137 transmits 412 the request for the one-time authorization code to the application server 137.

On receiving the request for the one-time authorization code from the application 137, the application server 140 verifies the application 137 is associated with the user's user account and generates a one-time authorization code. The application server 140 can associate the one-time authorization code with the user's user account and the device identifier of the application 137, and may store the one-time authorization code and the association in the data store 310. The application server 140 can retrieve the device identifier associated with the camera 130 from the request for the one-time authorization code received from the authenticated application 137. The application server 140 can further associate the one-time authorization code with the device identifier of the camera 130 and store the association in the data store 310, such that the application server 140 can identify and verify the device identifier associated with the camera 130 on receiving the one-time authorization code from the camera 130. The application server 140 returns 414 a copy of the one-time authorization code to the application 137.

The application 137 transmits the one-time authorization code to the camera 130. The one-time authorization code can be used by the camera 130 to authenticate communications between the camera 130 and the application server 140. The one-time authorization code may be associated with an expiration value such that the one-time authorization code may be valid for a threshold period of time. In order for the camera 130 to use the one-time authorization code to authenticate communications between the camera 130 and the application server 140, the camera 130 initiates the authentication process using the one-time authorization code within the threshold period of time.

The camera 130 transmits a request 418 for a camera access token to the application server 140. The request includes the device identifier identifying the camera 130 and the one-time authorization code provided to the camera 130 by the application 137. The application server 130 validates the request for the camera access token by verifying the one-time authorization code. The application server 140 verifies whether the one-time authorization code is associated with the device identifier associated with the camera 130 by retrieving the device identifier for the camera 130 associated with the one-time authorization code stored in the data store and determining if the retrieved device identifier matches the device identifier of the camera 130 included in the request 418 for the camera access token. Verifying the one-time authorization can further include checking to see if the one-time authorization code has expired. After successfully verifying the one-time authorization code, the application server 140 generates a camera access token.

In addition to generating the camera access token, the application server 140 retrieves the device identifier associated with the application 137 (for example based on the one-time authorization code or the device identifier associated with the camera 130). The application server 140 associates the camera access token with the user account associated with the device identifier of the application 137. The application server 140 stores the association between the user account and the camera access token in the data store 310 and/or the user account store 305. The application server 140 returns 420 the camera access token and a refresh token to the camera 130. In one embodiment, the camera access token is associated with an expiration value defining a threshold period of time for which the camera access token is valid. The camera 130 can now make authenticated requests to the application server 140 using the camera access token. Accordingly, the process, as described above may be used to authenticate limited input devices, wherein a one-time authorization code is exchanged for an access token by the application server 140.

Once the camera 130 is authenticated, the application server 140 can receive an authenticated request from the camera 130 to register 422 the camera 130. In one example, the authenticated request includes the camera access token, and device information, such as the client device 135 associated with the camera 130, the make and model of the camera 130, features associated with the camera 130, device identifier of the camera 130, etc. The application server 140 can verify 424 the camera access token and device information received from the camera 130 to determine the user account associated with the camera 130. For example, the device manager 320 identifies a user account stored in the user account store 305 associated with the camera access token based on an association between the camera access token and user account stored in the data store 310. The application server 140 then links 426 the camera 130 with the determined user account, thereby associating the camera 130 with the determined user account and completing the registration of the camera 130. The application server 140 can transmit 428 a confirmation of the registration of the camera 130 to the camera 130 such that the confirmation of the registration may be viewed by the user of the camera 130.

Additional Configuration Considerations

The disclosed configurations beneficially provide a method or system for authenticating a limited input device without receiving extensive input from a user via the limited input device. Users of limited input devices often have to authenticate the limited input device with an application server, for example, by transmitting to the application server credential information identifying the user. Entering credential information into a limited input device is often inconvenient due to the lack of user input options (e.g., some devices, such as cameras, may have a limited number of buttons). The disclosed configurations allow a user to authenticate a limited input device via an already authenticated application executing on a different client device, such as a smartphone. Once the limited input device is paired with the authenticated application, the authenticated application can request a one-time authorization code from the application server to provide to the limited input device. On receiving the one-time authorization code from the limited input device, the application server authenticates the limited input device and associates the user with the limited input device. Thus, in the disclosed configurations the user is able to authenticate the limited input device without extensively interacting with the limited input device (e.g., entering credential information on the limited input device).

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative configurations of authenticating a limited input device based on an authenticated application. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A system, comprising:
an authenticated application executing on a first device;
a camera paired with the authenticated application using a first device identifier, the authenticated application configured to enable a user to control one or more camera functions of the camera by interacting with the authenticated application; and
a computer program product comprising a non-transitory computer-readable storage medium having instructions encoded thereon that, when executed by a processor, causes the processor to:
in response to receiving a request including the first device identifier from the authenticated application for a one-time authorization code, transmit the one-time authorization code to the authenticated application,
receive a request for an access token from the camera, the request including the one-time authorization code and a second device identifier,
in response to verifying the one-time authorization code by determining that the second device identifier matches the first device identifier, authenticate the camera by providing the camera with the access token,
associate the access token with a user account,
receive one or more images associated with the user account from the camera, and
in response to determining that the access token has expired, receive a refresh token from the camera and provide a new access token to the camera.

2. The system of claim 1, wherein the computer program product is a server device.

3. The system of claim 1, wherein the authenticated application is associated with the user account that is maintained by the computer program product.

4. The system of claim 1, wherein the instructions, when executed by the processor, further causes the processor to:
in response to determining that the received access token is valid, identify the user account associated with the received access token and store the one or more images in a portion of a memory associated with the user account.

5. The system of claim 1, wherein the instructions to verify the one-time authorization code further comprises instructions that, when executed by the processor, further causes the processor to:
determine if the one-time authorization code is received from the camera within a threshold time period from when the one-time authorization code was provided to the authenticated application.

6. A method, comprising:
pairing a camera with an authenticated application using a first device identifier, the authenticated application executing on a first device and configured to enable a user to control one or more camera functions of the camera by interacting with the authenticated application;
in response to receiving a request including the first device identifier from the authenticated application for a one-time authorization code, transmitting the one-time authorization code to the authenticated application, receiving a request for an access token from the camera, the request including the one-time authorization code and a second device identifier, in response to verifying the one-time authorization code by determining that the second device identifier matches the first device identifier, authenticating the camera by providing the camera with the access token, associating the access token with a user account, receiving one or more images associated with the user account from the camera, and in response to determining that the access token has expired, receiving a refresh token from the camera and provide a new access token to the camera.

7. The method of claim 6, further comprising:
associating the authenticated application with a user account.

8. The method of claim 6, further comprising:
in response to determining that the received access token is valid, identifying the user account associated with the received access token and storing the one or more images in a portion of a memory associated with the user account.

9. The method of claim 6, wherein verifying the one-time authorization code further comprises:
determining if the one-time authorization code is received from the camera within a threshold time period from when the one-time authorization code was provided to the authenticated application.

10. A non-transitory computer-readable storage medium having instructions encoded thereon that, when executed by a processor of a server, causes the server to:
pair a limited input device with an authenticated application using an access token, the authenticated application executing on a first device and configured to enable a user to control one or more camera functions of the limited input device by interacting with the authenticated application;

in response to receiving a request including the first device identifier from the authenticated application for a one-time authorization code, transmit the one-time authorization code to the authenticated application, receive a request for an access token from the limited input device, the request including the one-time authorization code and a second device identifier, in response to verifying the one-time authorization code by determining that the second device identifier matches the first device identifier, authenticate the limited input device by providing the limited input device with the access token, associate the access token with a user account, receive one or more images associated with the user account from the limited input device, and in response to determining that the access token has expired, receive a refresh token from the limited input device and provide a new access token to the limited input device.

11. The non-transitory computer-readable storage medium of claim 10, wherein the instructions, when executed by the processor, further causes the server to:
in response to determining that the received access token is valid, identify the user account associated with the received access token and store the one or more images in a portion of a memory associated with the user account.

\* \* \* \* \*